United States Patent Office.

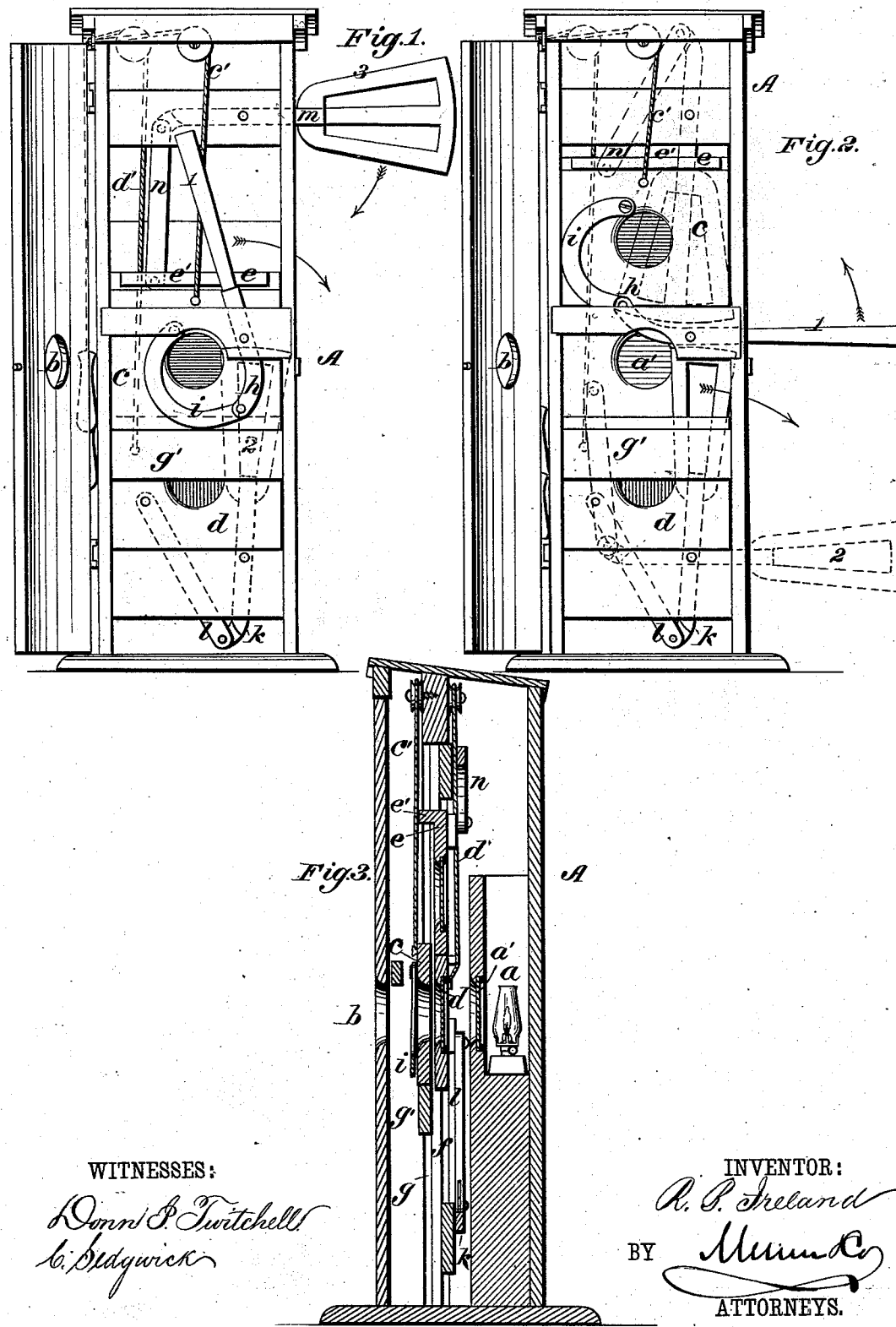

RICHARD B. IRELAND, OF TRENTON, NEW JERSEY.

RAILWAY-SIGNAL.

SPECIFICATION forming part of Letters Patent No. 225,137, dated March 2, 1880.

Application filed December 27, 1879.

*To all whom it may concern:*

Be it known that I, RICHARD B. IRELAND, of Trenton, in the county of Mercer and State of New Jersey, have invented a new and useful Improvement in Railway-Signals, of which the following is a specification.

My improvements relate to signaling apparatus used in the "block" system of signals for the movement of trains, in which system the road is divided into sections or blocks with a signal-station between each block, and no train allowed to pass a station without a signal from the operator.

Heretofore there has been great liability of the engineer mistaking the signals; and the object of my invention is to prevent such mistakes, which I accomplish by giving to the signals a definite form and position, either of which will indicate, in addition to the color, the exact character of the signals.

My invention also relates to the mechanism for operating the signals, all of which features I will describe more particularly with reference to the accompanying drawings, forming part of this specification.

In the drawings, Figure 1 is a side elevation of my improved signaling apparatus in its normal position, with the box open to show the interior mechanism. Fig. 2 is a similar view, with the white or safety signal thrown out. Fig. 3 is a vertical section at right angles to Figs. 1 and 2, with the parts in the position they occupy when the green or cautionary signal is thrown out.

Similar letters of reference indicate corresponding parts.

A is the box or housing which carries the mechanism to protect it from the weather, and containing a lamp, $a$, for illuminating the night-signals, which show through the aperture $b$ of box A. The day-signals are thrown out by the operation of vertically-moving slides, which are fitted with glass of the proper color. The slide $c$ gives the white or safety signal and operates the white banner, which, for convenience, is numbered 1. The slide $d$ operates the green or cautionary signal-banner 2, and the slide $e$ operates the red or danger signal-banner 3. The slides $c\ d$ are fitted for being raised by their respective cords $c'\ d'$, and the slide $e$ is raised by the movement of either slide $c$ or $d$, as next described.

At the inner sides of the box A there are formed vertical grooves or slideways $f\ g$. In the groove $f$ are fitted the slides $d\ e$, the red slide $e$ being above and resting upon the green slide $d$, while the white slide $c$ works in the groove $g$ and rests on a stop, $g'$, so that its aperture is in front of the lamp $a$. The red slide $e$, when down, is also in front of lamp $a$, and in use is seen through the aperture in $c$.

Upon the upper edge of slide $e$ is a lip or flange, $e'$, which projects over the white slide $c$, so that when the latter is raised it carries slide $e$ upward and leaves the white glass $a'$, in front of the lamp, exposed.

When the green slide $d$ is raised it also carries up the red slide, and the light shines through the green glass of slide $d$, which position is shown in Fig. 3. The slides come down by gravity, so that the normal position is with the red signal in view.

The white banner 1 is attached upon the end of a lever, $h$, that is hung to a cross-bar in box A, about midway between top and bottom of the box, and the lever $h$ is connected by a curved link, $i$, with the slide $c$, so that when said slide is down the banner 1 is within box A, and the movement of said slide upward throws the banner out through an opening in the side of the box to a horizontal position, as shown in Fig. 2. The green banner 2 is upon a lever, $k$, that is connected by a link, $l$, to slide $d$, said lever being hung near the bottom of box A, so that by raising slide $d$ the banner 2 is thrown out, as shown in dotted lines in Fig. 2. The red banner 3 is hung at the top of box A on a lever, $m$, that is connected to slide $e$ by a link, $n$, so that when the slide $e$ is down to its normal position the banner 3 is thrown out, as shown in Fig. 1, and when said slide is raised the banner 3 is drawn in, as seen in Fig. 2.

Thus it will be seen that the banners are each thrown out at a different position from the other, and the character of the signal may thus be determined by its position alone.

As a further guarantee, to prevent mistakes, the banners will vary in shape, preferably as shown—that is, the banner 1 consists of a single arm, banner 2 of two arms, and 3 of three arms, thus enabling the character of the signal to be determined positively by color, shape, or position. This feature is important, as accidents are of frequent occurrence on railways from one signal being mistaken for another.

It is to be understood that, in practice, the box A will be placed between the two tracks, and a similar set of slides and signals fitted at opposite sides of the lamp and separately operated for signaling the right or left hand track.

The mechanism described is simple and durable, and has the certainty and reliability of operation that are necessary in railroad-signals.

The mechanism and signals are protected from the weather; and it will be seen that in case the danger-signal becomes covered with snow or ice and its color hidden its position will prevent its being mistaken for a white signal.

Having thus described my invention, I claim as new and desire to secure by Letters Patent—

1. In railway-signals, the vertically-moving signal-slides $c$ $d$ $e$ and the pivoted levers $h$ $k$ $m$, carrying banners, combined together and with the box A for operation substantially as described and shown.

2. In railway-signals, the signaling-slides $c$ $d$, fitted with the signaling-banners 1 2, combined with the slide $e$, carrying the banner 3, substantially as shown and described, whereby the slide $e$ is operated by the movement of either slide $c$ or $d$, for the purposes set forth.

3. In railway-signals, the banners 1, 2, and 3, varying in shape and pivoted one above the other, combined with the box A and operating-slides, substantially as described and shown, whereby the banners are projected at separate points, as specified.

RICHARD B. IRELAND.

Witnesses:
GEO. D. WALKER,
C. SEDGWICK.